US008986438B2

(12) United States Patent
Merrifield et al.

(10) Patent No.: US 8,986,438 B2
(45) Date of Patent: Mar. 24, 2015

(54) STAINLESS PLUMBER'S PUTTY

(75) Inventors: Wayne A. Merrifield, Hamburg, NJ (US); Hsing Hui Yu, Kearny, NJ (US)

(73) Assignee: Oatey Co., Cleveland, OH (US)

( * ) Notice: Subject to any disclaimer, the term of this patent is extended or adjusted under 35 U.S.C. 154(b) by 246 days.

(21) Appl. No.: 13/400,331

(22) Filed: Feb. 20, 2012

(65) Prior Publication Data

US 2013/0213262 A1    Aug. 22, 2013

(51) Int. Cl.
    *C08L 91/00*    (2006.01)
    *C09J 191/00*    (2006.01)
    *C09J 167/00*    (2006.01)

(52) U.S. Cl.
    CPC .............. *C09J 191/00* (2013.01); *C09J 167/00* (2013.01)
    USPC .............. 106/266; 106/33; 277/650; 524/310

(58) Field of Classification Search
    None
    See application file for complete search history.

(56) References Cited

U.S. PATENT DOCUMENTS

| 4,534,926 | A | 8/1985 | Harriett |
| 4,956,021 | A | 9/1990 | Kerze |
| 5,319,021 | A | 6/1994 | Christy |
| 6,238,473 | B1 | 5/2001 | Mexwell et al. |
| 7,434,812 | B2 | 10/2008 | Wrobleski et al. |
| 8,454,773 | B2* | 6/2013 | Cisneros .......................... 156/71 |
| 2001/0037848 | A1 | 11/2001 | Sciarrino et al. |
| 2007/0114726 | A1* | 5/2007 | Wrobleski et al. ............ 277/312 |

OTHER PUBLICATIONS

Bruce W. Maki HammerZone.com Part 2: Bath Vanity and Lavatory: Connecting the Plumbing. http://hammerzone.com/archives/bath/projects/remod_W1/vanity_s/faucet_moen84200.htm, Aug. 2000.
International Search Report and Written Opinion from International Application No. PCT/US2006/45305, mailed Oct. 4, 2007.

\* cited by examiner

*Primary Examiner* — Melissa Swain
(74) *Attorney, Agent, or Firm* — Calfee, Halter & Griswold LLP

(57) ABSTRACT

A stainless putty composition is provided that includes a liquid portion including vegetable oil, and a solids portion. The solids portion includes one or more of a filler and polymeric plasticizer. The stainless putty composition is essentially free of hydrocarbons.

18 Claims, No Drawings

STAINLESS PLUMBER'S PUTTY

FIELD OF THE INVENTION

The present invention relates to a putty composition. More specifically, the present invention pertains to a non-staining plumber's putty that significantly reduces the risk of staining porous stone.

BACKGROUND

Plumber's putty is used in the plumbing and construction industry to seal fixtures in either the bath or kitchen areas, such as the sink or tub strainer, faucets and setting sinks. Plumber's putty is typically known for being adhesive, remaining pliable and plastic, and being resistant to water. Typical plumber's putty consists of mineral fillers, such as calcium carbonate and clays, as well as oils and solvents. Fish oil has been the standard oil used in this application, because of its viscosity, tack and low cost. The putty composition based on fish oil is such that the putty is easily manipulated by hand and can be rolled into any form consistent with the sealing job at hand. The putty composition also has the characteristics that once in place it will not dry out or crack, will retain its adhesive properties, and will maintain a stable consistency and its ability to fill gaps during installation. However, fish oil has created difficulty for plumber's due to its tendency to form annular stain rings across the surfaces of porous stone, such as marble or granite. The oils in the putty are drawn into porous stone, such as marble or granite, leaving a permanent stain or shadow on the stone. The shadow often appears within hours of installation and cannot be removed by cleaning.

A variety of plumber's putty is often labeled as stainless putty, but is mistakenly characterized as so, since numerous tests on soft, porous stone reveal the immediate presence of a stain or shadow. Even plumber's putty sold as "stainless putty" often has warnings on the directions not to use with porous stone such as marble or granite. Using regular plumber's putty on porous stone results in considerable damage to the appearance of the stone and is not repairable by any cleansing process.

A variety of techniques have been attempted to circumvent this problem. For example, the area in contact with the plumber's putty can be coated with a clear acrylic coating. However, over time, the oils from the putty may work their way towards uncovered stone. Silicone caulk has also been used, but has the drawback of lacking the cohesiveness of plumber's putty and is difficult to apply.

U.S. Pat. No. 7,434,812 (the '812 patent), incorporated by reference herein in its entirety, describes a stainless putty based on the use of silicone rubber. This stainless putty has an improved stable white color, which is due to the replacement of traditional fish oils by polymeric plasticizers. However, it does not respond well in cold weather in comparison to oil-based putty. In addition, it is too expensive for use in both general and stain risk environments. Accordingly, its use is restricted to porous stone application due to cost and is not generally used in the more typical job.

Accordingly, there remains a need for an affordable stainless putty that may be used over a broad range of applications.

SUMMARY OF THE INVENTION

In accordance with one aspect of this invention, it has been found that a plumber's putty that is both stainless and inexpensive and can be made by replacing the hydrocarbons, providing that a natural oil is used in conjunction with one or more of a polymer plasticizer, clay, and zeolites. In particular, it has been found that a plumber's putty formulated in this way will not only be truly stainless, but also exhibit the elasticity and shape retention properties necessary for an effective plumber's putty, while being affordable for use in a broad range of applications.

Thus, this invention provides a stainless putty composition that includes a liquid portion including natural oil, a solids portion that includes one or more of a filler and polymer plasticizer, and is essentially free of hydrocarbons.

DETAILED DESCRIPTION

Various exemplary embodiments will now be described more fully. These exemplary embodiments may, however, be embodied in different forms and should not be construed as limited to the descriptions set forth herein. Rather, these exemplary embodiments are provided so that this disclosure will be thorough and complete, and will convey the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments. As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

A desirable stainless plumber's putty is pliable, elastic, has a degree of tack, provides sufficient adhesion to withstand the pressure of tightening, has an appropriate useful life, is insoluble in water, is resistant to temperature changes, and contain no chemicals or components that can cause or assist in the migration of stain causing ingredients from the putty to porous stone. The final composition should also be economically viable and represent no reasonable departure from how putty is historically used and manufactured.

Traditional plumber's putty contains a variety of hydrocarbon oils, fish oils and mineral solvents dispersed in clays and inorganic minerals, such as calcium carbonate. Hydrocarbon oils are typically saturated hydrocarbons based on liner or branched chains. Fish oils contain conjugated polyunsaturated acids, typically of the docosahexaenoic family. These acids are usually of the C-22 carbon chain variety. Fish oils are often blown to increase the viscosity of the oil and to reduce somewhat the color bodies through the reduction of conjugated bonds. A "blown oil" is a vegetable or animal oil that has been agitated and partially oxidized by a current of warm air or oxygen. The latter feature, reduction in color, is only partially successful. Blown oils, in order to reduce color bodies, must remain in the blowing process for extreme lengths of time, thus making this an impractical approach to color body reduction. Fish oils are viscous and difficult to process.

The combination of hydrocarbon and fish oil is used for blending the ingredients and providing flowable, malleable, and stable putty for use by a plumber. Typical formulations for plumber's putty contain 80% by weight mineral filler and approximately 20% liquid of which the fish oil is 80% by weight and the hydrocarbon 20% by weight. However, the very combination that provides the distinctive physical properties for application as a putty, also provides a process by which staining occurs. Staining will occur as long as there is a combination of natural or synthetic oils and hydrocarbon oils. Plumber's putty utilizing fish oil as the basic liquid stains porous surfaces within minutes and is non-reversible. However, regardless of the oil used the staining process for the standard formulation is immediate and significant.

The inventive stainless putty includes a liquid portion and a solids portion. The liquid component includes a specific class of natural oils that replaces the combination of hydrocarbon and fish oil. The specific class of natural oils acts as a processing aid, mixing the solid ingredients without the need for hydrocarbon oils.

In some exemplary embodiments, the natural oil is a vegetable oil, such as a cross-linkable natural bean oil, such as rapeseed oil, linseed oil, and particularly a castor oil. Castor oils are naturally occurring, inexpensive and environmentally friendly triglyceride oils obtained from the beans of the castor plant. Except for a few percentages of oleic acid and linoleic acid, the fatty acid chains of the triglycerides in castor oil are composed almost entirely of ricinoleic acid, which is a monosaturated 18-carbon atom fatty acid having a hydroxyl functional group on the 12th carbon atom. This hydroxyl functional group provides added stability to the castor oil through hydrogen bonding. The hydrogen-bonding functionality improves stability and increases the adherence of the putty composition to the intended surface. The added level of adhesion also provides a means to limit or minimize migration of the oils from the putty composition to the surface upon which it is applied. No other liquids are required for the final composition, although non-aggressive, non-staining solvents, such as mineral spirits can be employed to improve viscosity.

In some exemplary embodiments, the fatty acid chains of the triglycerides in castor oil include a minimum 70% by weight of ricinoleic acid. Ricinoleic acid is an unsaturated omega-9 fatty acid with a hydroxyl group at C-12. Omega-9 fatty acids are a family of unsaturated fatty acids that have in common a final carbon-carbon double bond in the n-9 position Fatty acid hydroxyl groups are also useful, such as 2-hydroxy-docosanoic acids, containing, 15-hydroxy-hexadecaanoic acid and dimorphecolic acid. Hydroxyl-conjugated acids, such as dimorphecolic acid and vermolic acid may be used, although the preferable hydroxyl-conjugated acid is ricinoleic acid. In some exemplary embodiments, the ricinoleic acid may be esterified as a triglyceride, which is the most suitable glycidic triester.

In some exemplary embodiments, the natural oil employed is blown castor oil. The blown form of the castor-triglyceride demonstrates a strong performance relative to staining and acting as a processing aid. Although similar in nature to the fish oils, the blown castor oils have an unexpected advantage over fish oils. The blown castor oils have reduced color bodies, but unexpectedly have a much lower level of migration when applied to porous stone as measured over a six-month period. Also, unexpectedly, the blown castor oils do not require a secondary solvent, such as hydrocarbon oil to produce the desired mixing characteristics in production or the desired physical attributes for application as a putty. The combination of the mineral fiber and the blown castor oil results in a strong white composition typical to plumber's' putty unlike the fish oil based formulation, where the use of the mineral fiber shows no clear advantage.

Blown castor oil is multifunctional, in that it encompasses the role of a processing aid by improving the mixing process of solids and liquids without resorting to hydrocarbon oil as a co-solvent. In some exemplary embodiments, the blown castor oil includes an average molecular weight range of 4000-8000. In other exemplary embodiments, the blown castor oil includes a Gardner-Holt viscosity rating at 25° C. of Z 8.5-Z 9.5. The blown castor oil may be present in the composition in an percentage by weight of about 5-30%, particularly 10-20%, and more particularly from about 15-20%.

Significant advantages of the vegetable oils include that they may act as a tack agent, adhering to the surface of a stone, and/or a flex agent, imparting softness. As a tack and/or flex agents, the vegetable oils block the movement of chemicals into the porous stone and are also preferably non-migratory in their own right, so as to not stain the stone.

The solids portion of the inventive plumber's putty composition may consist of fillers, including various naturally occurring clays, such as kaolin, bentonite, montmorillonite or modified montmorillonite, attapulgite, fuller's earth, etc., other naturally occurring or naturally derived materials such as mica, calcium carbonate, aluminum carbonate, various silicates such as calcium silicate, aluminum silicate, magnesium silicate, etc., various oxides such as titanium dioxide, calcium oxide, silicon dioxide (e.g., sand), various man-made materials such as precipitated calcium carbonate, precipitated silica, etc., various waste materials such as crushed blast furnace slag, etc., and the like. Particularly of interest are montmorillonite clay and calcium carbonate. In some embodiments, kaolin and calcium carbonate make up about 60-90% by weight, particularly about 70-80% by weight, and more particularly about 75% by weight of the composition, with about 80-90% by weight of the solids portion consisting of calcium carbonate and about 10-20% by weight of the solids portion consisting of montmorillonite clay.

The montmorillonite clay provides a certain degree of smoothness and structural stability to the putty, whereas the calcium carbonate provides bulk, but also moderates the final cost of the composition. The use of montmorillonite clays is desirable, as they contribute to the general smoothness of the putty as well as impart a good feel to the composition. When multiple montmorillonite clays are used, it is beneficial to select montmorillonite clays that are similar in structure and composition because improper selection or loadings may result in premature hardening of the putty.

In some exemplary embodiments, portions of the montmorillonite clay fraction may be replaced by sodium bentonite, such as fullers earth, which is a derivative of sodium montmorillonite. Although typical montmorillonite clay, such as kaolin clay, has never demonstrated a reduction of staining, sodium bentonite unexpectedly does reduce staining. If used, the sodium bentonite may be included in an amount ranging in percent by weight from about 0-10% and preferably between 0.5-10% by weight. Surprisingly, the level of sodium bentonite may be held to as low as about 1-2% by weight and still retain the characteristic of non-staining.

Calcium carbonate obtained from natural sources is typically platelet in form and is normally referred to as "ground" calcium carbonate. Calcium carbonated produced synthetically is normally referred to as "precipitated" calcium carbonate. Both types can be used as the high density filler in this invention. For best results, the calcium carbonate used, whether ground or precipitated, will have a particle size of about 2-8 microns, more typically, 3-7 microns or even 4-6 microns in its smallest dimension.

Calcium carbonate is widely used as a filler in putty materials. For example, calcium carbonate is used in amounts of up to 70 phr (parts per hundred parts of resin) to improve the tensile strength, elongation and volume resistivity of polyvinyl chloride sheathing for electrical cables. In addition, calcium carbonate is also used to increase the rigidity of polypropylene and as a filler (extender) in ABS (acrylonitrile/butadiene/styrene) thermoplastic resins as well as various thermosetting resins. Calcium carbonate is a good option as a filler for use in this invention, because it can impart a significant improvement in the mechanical properties of plumber's putties in which it is contained.

In some exemplary embodiments, the inventive stainless putty also includes hydrated sodium zeolite, alone or in combination with sodium bentonite. The zeolite mineral provides similar stain protection as sodium bentonite. The sodium zeolite may be included in an amount ranging in percent by weight from about 0% to about 10%. Hydrated sodium zeolite is typified by PQ Corporation Advera 401/401P. This type of zeolite has been primarily used as a heat stabilizer in PVC formulations. Due to the pore size of 4 Angstroms, it is ideally suited for sequestering metal ions. Hydrated sodium zeolite is not typically used to absorb larger, organic molecules, because of the cavity size.

In some exemplary embodiments, a polymeric plasticizer may be included in the inventive stainless putty and may replace portions of the clay. The polymeric plasticizer consists of a polymer that plasticizes the plumber's putty. The addition of the polymeric plasticizer enhances the stain blocking performance of the putty. The polymer plasticizer may be included in small quantities, such as 0-5% by weight, preferably 1-3% by weight, and more preferably about 1.8% by weight. In some exemplary embodiments, polymeric plasticizer acts as a tack agent, but at extremely low levels, such as less than 1% by weight. The plasticizer provides tack and adhesion properties.

In some exemplary embodiments, the polymeric plasticizer has the attributes of being either non-migratory on porous stone or act as a blocking agent to prevent migration onto the stone, or both. Migration of the oil stain may be measured by placing 10 grams of the finished putty on a porous stone and then measuring the diameter of the ring, caused by the migration of the oil, after 24 hours. Traditional plumber's putty will cause a shadow stain within minutes of application. The inventive putty will exhibit substantially no detectable stain under these conditions.

The polymeric plasticizer preferably comprises a low molecular weight (about 4000-100,000) polyester and can be complemented with or replaced by a variety of other polymers of the same molecular weight, including polyalkanes, alkenes, and branched polymers. Examples include polybutane, polybutene and polyisobuytlene. In some exemplary embodiments, the polymeric plasticizer is replaced by alkyl dibasic acid esters, esters of trimetillic acid, and/or other similar polyacids.

In some exemplary embodiments, the sodium bentonite, zeolites, and/or polymeric plasticizers act as blocking agents that operate in concert with the natural oil to eliminate staining. The stain blocking performance can be particularly enhanced by using a combination zeolites and fuller's earth; however, any combination of blocking agents used in conjunction with synthetic fiber with a high fiber index help to also impart whiteness. The three blocking agents may be used individually or in combination in the formulations employing castor oil. In contrast to the stain resistance provided by sodium bentonite and/or zeolite when used in combination with castor oil, use of these materials in conventional putty employing fish oil and hydrocarbon as the liquid portion leads to staining. Therefore, the combination of the castor oil with any of the three blocking agents detailed above provides desirable stain resistance.

Fuller's Earth and/or zeolites in combination with the use of castor oils significantly improves resistance to staining as compared to just combinations of castor oil and polymeric plasticizer. In contrast, the use of zeolites or bentonites with the standard fish oil-based putty still exhibits significant staining and has no apparent effect on reducing staining.

Besides clays, carbonates, and bentonites, other solids can be selected from the family of rheological additives, such as binders, including fumed silica. These should be used in low quantities in order to avoid premature aging or solidification of the putty. Other additives may be employed in the composition, such as mildewcides, whitening agents, and inorganic fibers. Synthetic fibers, such as polyamides or polyesters, may also be included.

According to various exemplary embodiments, the inventive stainless putty composition includes about 15-20% by weight castor oil, about 0-2% by weight polymeric plasticizer, about 0-2% by weight fuller's earth, about 0-2% by weight hydrated sodium zeolite, with the remainder comprising a mineral filler and other additives. In some exemplary embodiments, the stainless putty composition includes about 15-20% by weight castor oil and between about 0.5-2% by weight of at least one of fuller's earth, hydrated sodium zeolite, and polymeric plasticizer. In other exemplary embodiments, the stainless putty composition includes about 15-20% by weight castor oil and between about 0.5-2% by weight of at least two of fuller's earth, hydrated sodium zeolite, and polymeric plasticizer. In other exemplary embodiments, the stainless putty composition includes about 15-20% by weight castor oil and between about 0.5-2% by weight of each of fuller's earth, hydrated sodium zeolite, and polymeric plasticizer. In other exemplary embodiments, the stainless putty composition includes about 15-20% by weight castor oil and at between about 1-2% by weight of at least one of fuller's earth, hydrated sodium zeolite, and polymeric plasticizer. This combination provides a blend that provides stain resistance as well as optimizes the physical properties, such as tack, stretch, malleability and aging.

Functional fibers, which can improve the stain resistance of the composition, include synthetic fibers, such as Fibrox 030. Synthetic fibers, which are high in fiber content, and have aspect ratios in the range of +500 to +1000, can be used.

In some exemplary embodiments, the use of castor oil is the primary component, which dramatically reduces staining. The reduction in staining may be further improved by using very low concentrations of polymeric plasticizer, sodium bentonite, and/or zeolites. The level of polymeric plasticizers, sodium bentonite, and/or zeolites used in combination with the castor oil may be on the order of 1% by weight, thus indicating an unexpected level of stain blocking efficiency.

The ratio of liquids to solids is also important to both the non-staining characteristics and physical properties of the stainless putty. In some exemplary embodiments, the ratio of liquid to solids ranges from about 1:3 to about 1:6. The liquid to solids range of about 1:4 to about 1:5 is even more interesting.

Table 1 below illustrates one exemplary embodiment of the inventive stainless putty compared to traditional plumber's putty formulations.

TABLE 1

TEST FORMULATION EXAMPLES (in weight percent)

| Components | Ex 1 Commercially Available Fish oil-Based Putty- | Ex 2 | Ex 3 Inventive Vegetable Oil Based Putty | Ex 4 | Ex 5 Commercially Available Stainless Putty | Ex 6 |
|---|---|---|---|---|---|---|
| Hydrocarbon Oil | 13.1 | | | | | |
| Fish Oil | 4.5 | | | | | |
| Castor Oil | 0 | 17.6 | 15.8 | 15.8 | | 15.8 |
| Castor Oil | 0 | | | | | |
| Polymeric Plasticizer | 0 | | 1.8 | | 18 | 3 |
| Silicone Rubber | 0 | | | | 5 | |
| Sodium Bentonite | 0 | 0 | | 2 | | 3 |
| Zeolite | 0 | 0 | 2 | 0 | 0 | 3 |
| Organic Bentonite | 1.8 | 1.8 | 1.8 | 1.8 | .5 | .5 |
| Kaolin Clay | 7.9 | 7.9 | 6.9 | 7.7 | 8.3 | 8.3 |
| Calcium Carbonate | 71 | 71.4 | 70.4 | 71.4 | 68.2 | 65.1 |
| Fiber | 1.2 | 1.2 | 1.2 | 1.2 | | 1.2 |
| Antimold | .04 | .04 | .04 | .04 | | 0.4 |
| Solvent | .5 | .1 | .1 | .1 | | .1 |

Ref = Hercules Sta-Put ®;
Ex 2 = Castor Oil Based Putty;
Ex 3 = 90:10 blend of Castor Oil and Parallax G40;
Ex 4 = Castor Oil with 2% Fullers Earth;
Ex 5 = Hercules Sta-Put ® Ultra ™

The stain blocking characteristics of each example were tested by using a 10 gram sample of putty rolled into a ball, approximately ¾-1 inch in diameter. The various formulations tested are reflected above in Table 1. Each ball of putty was firmly pressed onto a clean surface of either a porous marble or granite test sample. In order to compare the results, two types of commercially available plumber's putty were also applied in the same fashion. Within 1-2 hours, the first stain or shadow appeared, surrounding both of the traditional plumber's putties.

The inventive stainless putty, Examples 2-4, were tested for up to 6 months and no appearance of a stain or shadow surrounded the stainless putty. Additionally, over the 6 month period, the samples maintained their integrity in that they did not dry out, become friable, or lose their plasticity.

TABLE 2

Oil Stain Comparisons (Inches)

| | 1 day | 15 days | 30 days | 150 days | 180 days |
|---|---|---|---|---|---|
| Example 1 | 0.0625 | 0.3750 | 0.7500 | 1.7500 | 2.0000 |
| Example 2 | 0 | 0 | 0.1875 | 0.1875 | 0.1875 |
| Example 3 | 0 | 0 | 0 | 0.01875 | 0.1875 |
| Example 4 | 0 | 0 | 0 | 0.0625 | 0.0625 |
| Example 5 | 0 | 0 | 0 | 0 | 0 |
| Example 6 | 0 | 0 | 0 | 0.1250 | 0.1250 |

The samples were removed from the surface of the stone after six months, rolled by hand, and reapplied to the stone surface for further testing. As shown above, in comparing the inventive stainless plumber's putty, Examples 2-4, with the commercially available plumber's putty examples, the inventive putties exhibited dramatically reduced or eliminated staining depending on the composition, as illustrated in Table 2, above. Each example listed above in Table 2 reflects the average of 5 samples from the same batch. A result of zero indicates that no migration occurred.

The inventive plumber's putty samples were also comparatively tested for hardness through the use of a penetration test, which measures how deep a weighted needle of a particular size penetrates a quantity of the plumber's putty in a particular period of time under the influence of gravity. The penetration test measures the penetration of a test needle into a standard sample of the putty under a defined weight-pressure.

TABLE 3

Penetration Tests

| Sample | Penetration Reading @25° C. (mm) |
|---|---|
| Example 1 | 130 |
| Example 2 | 114 |
| Example 3 | 98 |
| Example 4 | 74 |
| Example 5 | 89 |
| Example 6 | 170 |

The penetration value of preferred plumber's putties made in accordance with this invention is desirably about 50-200 mm (millimeters), more desirably 60-170 mm, or even 75-140 mm. All samples are stored at 25° C. for 16 hours and then tested for penetration. The results are listed above in Table 3. As shown above, each of the inventive samples (Examples 2-4) indicated preferred penetration values.

Another characteristic of plumber's putty is its ability to be rolled and shaped into various forms. A break point of 8 inches is considered standard and acceptable. To test this characteristic 75.0-grams of each putty sample was rolled into a cylinder approximately ¼ inch in diameter by 4 inches long. The test samples were then slowly stretched by hand to a point where they break.

TABLE 4

Rollout Elongation Test
Roll Out Length prior to Break

| | First Stretch | Second Stretch |
|---|---|---|
| Example 1 | 4 inch to 8 inch | 4 inch to 7.75 inch |
| Example 2 | 4 inch to 15 inch | 4 inch to 19.5 inch |
| Example 3 | 4 inch to 6.25 inch | 4 inch to 7 inch |
| Example 4 | 4 inch to 6 inch | 4 inch to 6 inch |
| Example 5 | 4 inch to 10.25 inch | 4 inch to 12.5 inch |
| Example 6 | 4 inches to 12.5 inches | 4 inches to 13.0 inches |

As illustrated above in Table 4, relative to the commercially available plumber's putty as references, all inventive examples are considered within the acceptable range. Each example was tested in duplicate; i.e., first stretch and second stretch.

Another characteristic of plumber's putty is that the same cylinder of putty can be cleanly broken by rapidly pulling apart the cylinder sample. Both the traditional plumber's putties and the inventive putties (Examples 2-4) exhibit the same fracturing characteristics. This is a critical feature of putty in that the plumber must be easily able to isolate specific quantities to be rolled into a desired shape for application at hand. A simple caulk material, such as silicone caulk, would simply stretch and not fracture.

Although only a few embodiments of this invention have been described above, it should be appreciated that many modifications can be made without departing from the spirit and scope of this invention. All such modifications are intended to be included within the scope of this invention, which is to be limited only by the following claims:

What is claimed is:

1. A stainless putty composition comprising:
   a liquid portion including about 5-17.6% by weight vegetable oil;
   a solids portion-comprising
      about 60-90% by weight of at least one filler selected from mica, calcium carbonate, aluminum carbonate, silicates, oxides, precipitated calcium carbonate, precipitated silica, mineral fibers, and crushed blast furnace slag; and
      wherein the filler further includes one or more of montmorillonite clay, kaolin clay, and sodium bentonite;
   wherein the stainless putty composition exhibits less than 0.2 inches of oil migration when applied on a porous surface for 180 days.

2. The stainless putty composition of claim 1, wherein said vegetable oil comprises castor oil.

3. The stainless putty composition of claim 2, wherein said castor oil comprises blown castor oil.

4. The stainless putty composition of claim 3, wherein the blown castor oil has an average molecular weight range of 4000-8000.

5. The stainless putty composition of claim 3, wherein the blown castor oil is present in the composition in an amount of about 10-20% by weight.

6. The stainless putty composition of claim 1, wherein said composition is essentially free of hydrocarbon oil.

7. The stainless putty composition of claim 1, wherein said vegetable oil comprises at least 70% by weight ricinoleic acid.

8. The stainless putty composition of claim 1, further comprising a polymeric plasticizer in an amount between about 0-5% by weight.

9. The stainless putty composition of claim 8, wherein said polymeric plasticizer comprises a polyester having a molecular weight of about 4000-100,000.

10. The stainless putty composition of claim 1, further comprising at least one of modified montmorillonite, attapulgite, and fuller's earth.

11. The stainless putty composition of claim 1, further including about 0-10% by weight sodium zeolite.

12. The stainless putty composition of claim 1, wherein 10-20% by weight of the solids portion is one or more of montmorillonite clay, kaolin clay, and sodium bentonite.

13. The stainless putty composition of claim 1, further comprising about 1.0-3.0% by weight a polymeric plasticizer.

14. The stainless putty composition of claim 1, wherein 10-20% by weight of the solids portion is montmorillonite clay and 1-2% by weight of the solids portion is sodium bentonite.

15. A stainless putty composition, formulated to avoid staining when applied to a porous surface, comprising:
   a. a vegetable oil;
   b. a solids portion comprising at least one filler selected from montmorillonite clay, kaolin clay, sodium bentonite, mica, calcium carbonate, aluminum carbonate, silicates, oxides, precipitated calcium carbonate, precipitated silica, mineral fibers, and crushed blast furnace slag;
   c. wherein 10-20% by weight of the solids portion comprises one or more of montmorillonite clay, kaolin clay, and sodium bentonite; and
   d. a polymer plasticizer;
   wherein said stainless putty composition has a penetration value of about 50-200 mm.

16. The stainless putty composition of claim 15, wherein said vegetable oil comprises castor oil.

17. The stainless putty composition of claim 15, wherein said composition is free of hydrocarbon oil.

18. The stainless putty composition of claim 15, wherein composition comprises 15-20% by weight vegetable oil, 70-80% by weight calcium carbonate, and about 1-2% by weight of at least one of hydrated sodium zeolite and polymer plasticizer.

* * * * *